United States Patent
Verlaguet

(10) Patent No.: US 10,013,245 B2
(45) Date of Patent: *Jul. 3, 2018

(54) SYSTEMS AND METHODS FOR CONVERTING TYPED CODE

(71) Applicant: Facebook, Inc., Menlo Park, CA (US)

(72) Inventor: Julien Marcel Verlaguet, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/083,167

(22) Filed: Mar. 28, 2016

(65) Prior Publication Data

US 2016/0210129 A1    Jul. 21, 2016

Related U.S. Application Data

(63) Continuation of application No. 14/010,266, filed on Aug. 26, 2013, now Pat. No. 9,329,849.

(51) Int. Cl.
*G06F 9/45*  (2006.01)
*G06F 8/51*  (2018.01)
(Continued)

(52) U.S. Cl.
CPC ................. *G06F 8/51* (2013.01); *G06F 8/40* (2013.01); *G06F 8/437* (2013.01); *G06F 8/443* (2013.01);
(Continued)

(58) Field of Classification Search
CPC ...................... G06F 8/40–8/52; G06F 8/45516
See application file for complete search history.

(56) References Cited

U.S. PATENT DOCUMENTS 6,259,958 B1    7/2001  Steinman et al.
6,681,383 B1    1/2004  Pastor et al.
(Continued)

OTHER PUBLICATIONS

Engler, Dawson R. et al., "DCG: An Efficient, Retargetable Dynamic Code Generation System," 1994, pp. 263-272.*
(Continued)

*Primary Examiner* — Thuy Dao
*Assistant Examiner* — Christopher J Franco
(74) *Attorney, Agent, or Firm* — Sheppard Mullin Richter & Hampton LLP

(57) ABSTRACT

Techniques provided implement automatic data type annotation in dynamically-typed source code. A codebase, which may comprise a plurality of source code files, is scanned at a global level. The resulting scanned data may describe characteristics of the codebase, including variable and function usage. Based on inferences drawn from the scanning, data types are determined for different variables, expressions, or functions to facilitate conversion from dynamically-typed source code to statically-typed source code. For example, if a function is called once with a parameter value of data type A (e.g., class A), and another time with a parameter value of data type B (e.g., class B), a conversion tool may annotate the parameter variable in the declaration of the function with a data type D (e.g., class d) when data type D is identified as a common ancestor (e.g., superclass) to both data type A and data type B.

20 Claims, 6 Drawing Sheets

(51) Int. Cl.
  *G06F 9/38* (2018.01)
  *G06F 8/41* (2018.01)
  *G06F 8/40* (2018.01)
  *G06F 9/455* (2018.01)
(52) U.S. Cl.
  CPC .............. *G06F 9/38* (2013.01); *G06F 9/3846* (2013.01); *G06F 8/41* (2013.01); *G06F 9/45508* (2013.01)

(56) References Cited

U.S. PATENT DOCUMENTS

| | | | | |
|---|---|---|---|---|
| 7,010,783 | B2* | 3/2006 | de Jong | G06F 9/5016 717/131 |
| 8,296,747 | B2* | 10/2012 | Ishizaki | G06F 17/2223 717/140 |
| 8,863,079 | B2* | 10/2014 | Darcy | G06F 8/437 717/108 |
| 2003/0014556 | A1 | 1/2003 | Conway | |
| 2003/0177472 | A1* | 9/2003 | de Jong | G06F 9/5016 717/110 |
| 2006/0070022 | A1* | 3/2006 | Ng | G06F 17/3089 717/104 |
| 2006/0230393 | A1 | 10/2006 | Doh et al. | |
| 2008/0059875 | A1* | 3/2008 | Ishizaki | G06F 17/2223 715/256 |
| 2008/0320444 | A1 | 12/2008 | Meijer et al. | |
| 2010/0064281 | A1 | 3/2010 | Kimball et al. | |
| 2010/0299660 | A1 | 11/2010 | Torgersen et al. | |
| 2011/0131556 | A1 | 6/2011 | Tatsubori | |
| 2012/0180025 | A1 | 7/2012 | Webb | |
| 2013/0061212 | A1 | 3/2013 | Krause et al. | |
| 2013/0174135 | A1 | 7/2013 | Kiran et al. | |
| 2014/0019951 | A1 | 1/2014 | Petrova | |
| 2014/0040860 | A1* | 2/2014 | Darcy | G06F 8/437 717/114 |
| 2014/0143762 | A1 | 5/2014 | Li et al. | |
| 2016/0124727 | A1* | 5/2016 | Trojahner | G06F 8/437 717/143 |

OTHER PUBLICATIONS

Guo, Philip J. et al., "Dynamic Inference of Abstract Types," 2006, pp. 255-265.*
Burke, Michael G. et al., "The Jalapeño Dynamic Optimizing Compiler for Java," 1999, pp. 129-141.*
Wurthinger, Thomas et al., "Dynamic Code Evolution for Java," 2010, pp. 10-19.*
Schafer, Max et al., "Dynamic Determinacy Analysis," Jun. 2013, pp. 165-174.*
Hazelwood, Kim M. et al., "A Lightweight Algorithm for Dynamic If-Conversion During Dynamic Optimization," 2000, pp. 71-80.*
Furr, Michael, "Combining Static and Dynamic Typing in Ruby," PhD dissertation, Department of Computer Science, University of Maryland, 2009, pp. 90-135.
Haldiman, Niklaus, et al., "Practical, Pluggable Types for a Dynamic Language," Computer Languages, Systems & Structures, vol. 35, No. 1, Apr. 2009, pp. 48-62.
Hanenberg, Stefan, "An Experiment About Static and Dynamic Type Systems: Doubts About the Positive Impact of Static Type Systems on Development Time," Proceedings of the ACM International Conference on Object Oriented Programming Systems Languages and Applications, Oct. 2010, pp. 22-35.
Jana, Anushri, et al., "Precise Detection of Uninitialized Variables using Dynamic Analysis—Extending to Aggregate and Vector Types," Proceedings of the 2012 19th Working Conference on Reverse Engineering, Oct. 2012, pp. 197-201.
Qian, Feng, et al., "A Study of Type Analysis for Speculative Method Inlining in a JIT Environment," Proceedings of the 14th International Conference on Compiler Construction, Apr. 2005, pp. 255-270.
Siek, Jeremy G., et al., "Gradual Typing with Unification-based Inference," Proceedings of the 2008 Symposium on Dynamic Languages, Article No. 7, Jul. 2008, pp. 1-12.

* cited by examiner

SYSTEMS AND METHODS FOR CONVERTING TYPED CODE

CROSS-REFERENCE TO RELATED APPLICATIONS

This application is a continuation of U.S. patent application Ser. No. 14/010,266, filed on Aug. 26, 2013 and entitled "SYSTEMS AND METHODS FOR CONVERTING TYPED CODE", which is incorporated herein by reference.

FIELD OF THE INVENTION

The present application relates to source code and, in particular, converting source code, such as script code, from dynamic typing to static typing.

BACKGROUND

Various programming languages provide simplicity and ease in software development by supporting dynamic data typing of functions and variables (also referred to as, "dynamic typing"). Generally, programming languages that support dynamic typing may permit source code to use a variable without need for prior declaration of a variable data type (e.g., integer, Boolean, string, etc.), and may permit declaration of a function without need for prior declaration of a data type for a function return value or for a function parameter. Examples of programming languages that support dynamic data typing include such scripting languages as PHP, Perl, and JavaScript, which are often used in client-server environments to implement server-side programs, client-side programs, or both.

In contrast to dynamic data typing, programming languages that support static data typing (also referred to as, "static typing") may require source code to declare the data type of variables, function return values, and function parameters, either prior to or at the time of their use. Unlike dynamic typing, static typing causes data type verification (also known as type safety) of variables and functions to occur before runtime (e.g., during coding or compilation using a type checker), thereby allowing for data type errors to be detected much earlier in the development process. Additionally, source code that uses static typing often is easier to refactor (e.g., for better code readability, reduced code complexity, or easier code maintainability) than source code that uses dynamic typing.

SUMMARY

Techniques provided implement automatic data type annotation in dynamically-typed source code. A codebase, which may comprise a plurality of source code files, is scanned at a global level. The resulting scanned data may describe characteristics of the codebase, including variable and function usage. Based on inferences drawn from the scanning, data types are determined for different variables, expressions, or functions to facilitate conversion from dynamically-typed source code to statically-typed source code. For example, if a function is called once with a parameter value of class type A, and another time with a parameter value of class type B, a conversion tool may annotate the parameter variable in the declaration of the function with a class type D when type D is identified as a common ancestor (e.g., superclass) to both type A and type B.

As used herein, a "codebase" may refer to a collection of source code, where the collection may relate to a particular software application, platform, or component and where the collection may comprise a plurality of source code files. A "dynamically-typed variable" may refer to a variable used in source code that has type safety of the variable's value verified at runtime (e.g., when executable code compiled from source code is performed). In accordance with some programming languages, dynamic typing of a variable may be invoked, for example, by not specifying the data type of the variable when the variable is initially encountered in source code. A "dynamically-typed function" may refer to a function in source code that has type safety of its return value verified at runtime (e.g., when executable code compiled from source code is performed). In accordance with some programming languages, a dynamic typing of a function, for instance, may be invoked by not specifying the data type of a return value of a function or not specifying the data type of one or more parameters of a function when the function is declared (e.g., initially declared for prototyping).

A "statically-typed variable" may refer to a variable that has type safety of the variable's value verified during source code development (e.g., as the source code is being written) or during source code compilation. In accordance with some programming languages, statically typing of a variable may be invoked, for instance, by specifying the data type of the variable when the variable is initially encountered in source code. A "statically-typed function" may refer to a function in source code that has type safety of its return value verified during source code development (e.g., as the source code is being written) or during source code compilation. In accordance with some programming languages, a static typing of a function, for example, may be invoked by specifying the data type of a return value of a function and specifying the data type of the parameters of a function when the function is declared (e.g., initially declared for prototyping).

According to some embodiments, systems and methods (and computer readable media) can analyze a codebase comprising a first dynamically-typed variable or function, and determine based on the analyzing the codebase, a first set of characteristics relating to the codebase. The first set of characteristics can comprise information regarding usage of the first dynamically-typed variable or function in the codebase. In some embodiments, the first set of characteristics can comprise information regarding usage of variables and functions in one or more locations in the codebase. The systems and methods can determine a first set of potential data types for the first dynamically-typed variable or function based on the first set of characteristics. The systems and methods can determine a first candidate data type for the first dynamically-typed variable or function based on the first set of potential data types. The systems and methods can convert the first dynamically-typed variable or function in the codebase, to a first statically-typed variable or function in the codebase, based on the first candidate data type. The systems and methods can check the codebase for one or more errors in response to the converting the first dynamically-typed variable or function to the first statically-typed variable or function.

In some embodiments, the first set of characteristics can further comprise information regarding inheritance between data classes.

In some embodiments, the first candidate data type can be one selected from the first set of potential data types.

In some embodiments, the first candidate data type can be a common ancestor data type to each of the data types in the first set of potential data types.

In some embodiments, checking the codebase for one or more errors may comprise checking the codebase using a type checker.

In some embodiments, in response to detection of an error during the checking the codebase for one or more errors, systems and methods can revert the codebase to the first dynamically-typed variable or function.

In some embodiments, in response to detection of an error during the checking the codebase for one or more errors, systems and methods can determine a second candidate data type for the first dynamically-typed variable or function based on the first set of potential data types, wherein the second candidate data type is different from the first candidate data type. Subsequently, systems and methods can convert the first dynamically-typed variable or function in the codebase, to a second statically-typed variable or function in the codebase, based on the second candidate data type. The systems and methods can recheck the codebase for one or more errors in response to the converting the first dynamically-typed variable or function in the codebase to the second statically-typed variable or function.

In some embodiments, systems and methods can reanalyze the codebase, where the codebase can comprise the first statically-typed variable or function and a second dynamically-typed variable or function. This may occur, for example, when an error is not detected during the checking of the codebase for one or more errors, and additional variables and functions are being sought for conversion from dynamic typing to static typing. The systems and methods can determine, based on the reanalyzing the codebase, a second set of characteristics relating to the codebase, where the second set of characteristics can comprise information regarding usage of the second dynamically-typed variable or function in the codebase. The systems and methods can determine, based on the second set of characteristics, a second set of potential data types for the second dynamically-typed variable or function, and determine for the second dynamically-typed variable or function, a third candidate data type for the second dynamically-typed variable or function based on the second set of potential data types. Thereafter, the systems and methods can convert the second dynamically-typed variable or function in the codebase, to a third statically-typed variable or function in the codebase, based on the third candidate data type. The systems and methods can recheck the codebase for one or more errors in response to the converting the second dynamically-typed variable or function in the code base to the third statically-typed variable or function.

In some embodiments, the first candidate data type can be a Boolean, integer, float, double, character, string, or object.

In some embodiments, the first candidate data type can be a nullable Boolean, integer, float, double, character, string, or object.

In some embodiments, the converting the first dynamically-typed variable or function to a first statically-typed variable or function using the first candidate data type can comprise annotating the first dynamically-typed variable or function with the first candidate data type.

In some embodiments, the codebase comprises a collection of source code. The collection of source code can comprise a plurality of source code files. For example, the source code may be script code, such as PHP, Perl, or JavaScript.

In some embodiments, the first set of characteristics can include a first constraint regarding assignment of a value of a first data type, and the first set of potential data types can be determined to include the first data type.

In some embodiments, the first dynamically-typed variable or function can be a variable utilized as a parameter of a function in the codebase.

In some embodiments, the first dynamically-typed variable or function can be a function, in the codebase, having a dynamic return type.

In some embodiments, the codebase can relate to a social networking system.

Many other features and embodiments of the invention will be apparent from the accompanying drawings and from the following detailed description.

Figure 1:
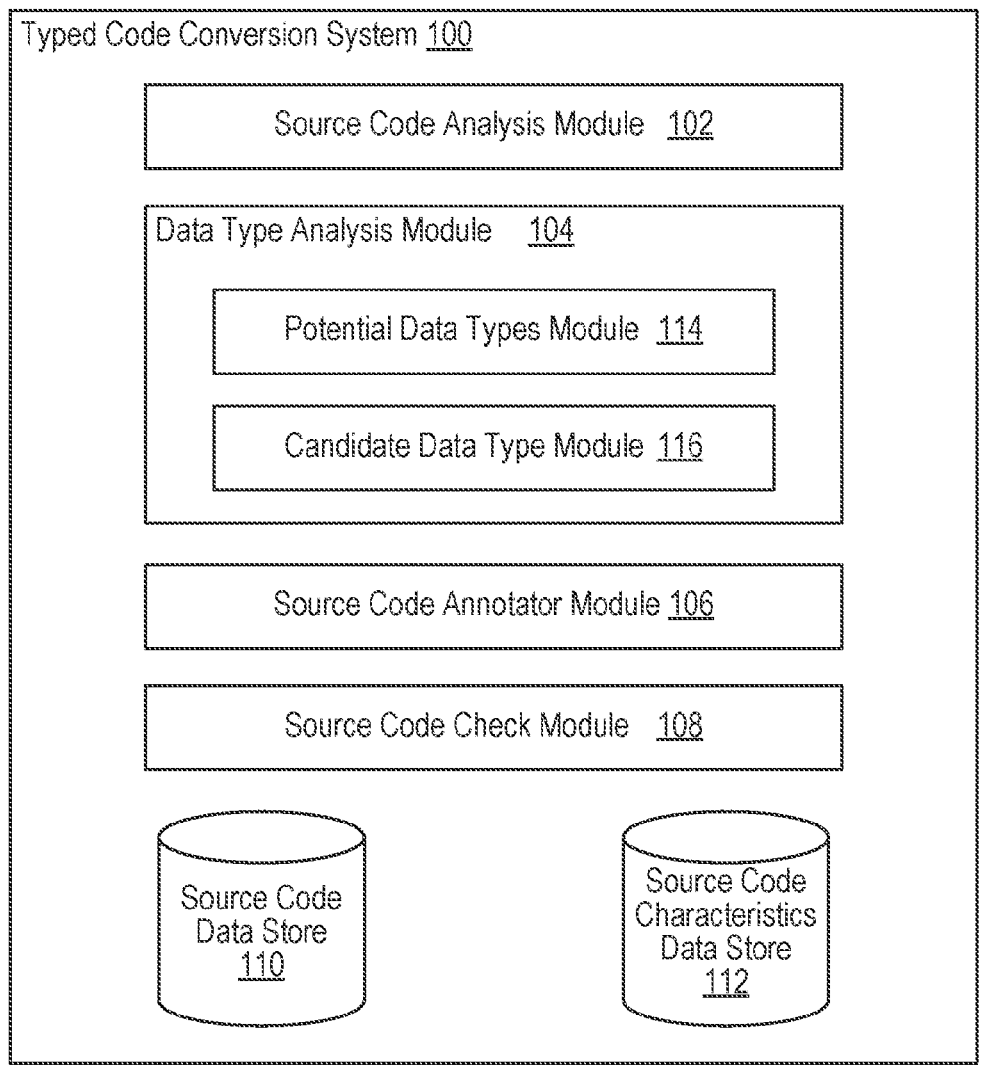
FIG. 1 illustrates an example data typed code conversion system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Statically-typed source code may require source code to declare the data type of variables, function return values, and function parameters, either prior to or at the time of their use. Unlike dynamic-typed source code, statically-typed source code results in type safety verification of variables and functions before runtime, thereby allowing for data type errors to be detected much earlier in the development process. Additionally, source code that uses static typing is often easier to refactor than source code that uses dynamic typing. According to various embodiments, systems and methods facilitate conversion of dynamically-typed source code to statically-typed source code. In doing so, the systems and methods overcome various drawbacks of dynamic typing, particularly with respect to late detection of type safety errors and difficulties in refactoring, In some embodiments, the systems and methods can analyze dynamically-typed source code and annotate dynamically-typed elements in the source code (e.g., variables or functions) with data types based on the analysis. For some embodiments, conversion from dynamically-typed source code to statically-typed source code may be performed when converting a source code from one programming language that permits dynamic data typing to another programming language that requires static data typing.

According to some embodiments, the dynamically-typed source code to be converted is part of a codebase, which may comprise a plurality of source code files. As described herein in further detail, the codebase may be a collection of source code which relates to or implements a software application, platform, or component. For instance, the codebase may comprise source code that implements some or all of a social networking system. It will be understood that a social networking system may have two or more codebases that implement various components of the social networking system. A codebase for the social networking system may comprise a plurality of script files that contain server-side script code intended to be performed by a server, or client-side script code intended to be performed at a client, or both.

To convert a codebase containing dynamic source code, systems and methods may scan the entirety of a codebase at a global level. The data resulting from the scan process may describe characteristics of the codebase, including variable and function usage in the source code of the codebase. The scanning process may, for example, generate facts or constraints regarding the source code in the codebase.

Based on inferences drawn from the scanning, data types are determined (e.g., deduced) for different variables, expressions, or functions in the source code to facilitate conversion from dynamically-typed source code to statically-typed source code. For example, if a function is called once with a parameter value of data type A (e.g., class A), and another time with a parameter value of data type B (e.g., class B), a conversion tool may annotate the parameter variable in the declaration of the function with a data type D (e.g., class d) when data type D is identified as a common ancestor (e.g., superclass) to both data type A and data type B.

The systems and methods described herein may be implemented as part of a source code or codebase conversion tool, which may be operate on existing source code or a codebase.

FIG. 1 illustrates an example typed code conversion system 100 in accordance with an embodiment of the invention. For some embodiments, the typed code conversion system 100 may be configured to convert dynamically-typed source code to statically-typed source code. The typed code conversion system 100 may be utilized to convert a codebase, such as one comprising script code that implements a social networking system, from containing dynamically-typed code to containing statically-typed code. To convert source code from being dynamically-typed to being statically-typed, the typed code conversion system 100 may modify the dynamically-typed source code to be statically typed (e.g., modify it to invoke static typing with respect to a variable or function in the source code).

The typed code conversion system 100 may perform this modification, for example, by annotating the dynamically-typed source code with one or more reserved keywords for the programming language, such as data type designators that specify the data type for the elements. Examples of data types that may be supported by a programming language may include, without limitation, "int" for integer data types, "float" for floating-point data types, "bool" for Boolean data types, "mixed" for elements that can receive a mix of data types, and "?" for those data types that are nullable (e.g., "?int" for a nullable integer data type, or "?float" for a nullable float data type). The reserved keywords used in the source code may depend on the programming language utilized in the source code. The typed code conversion system 100 may perform a conversion process such that the dynamically-typed source code and the resulting statically-typed source code are in the same programming language.

Additional examples of data types that may be supported may include data types defined within the source code (e.g., by a programmer), such as programmer-defined classes or structures. For example, where a data type Example_Class is defined in the source code by a programmer, the source code may invoke static data typing of a variable by including in the source code one or more keywords that correspond to the data type Example_Class. For some programming languages, the keywords corresponding to a data type defined within the source code may comprise the name of the data type, or an alias for the data type, defined in the source code (e.g., defined by the programmer in the source code). The one or more keywords employed to invoke static data typing with respect to a programmer-defined data type may depend on the programming language and differ between different programming languages. Additionally, for some programming languages, invoking static data typing with respect to a data type may comprise combining keywords with characters or operators defined by the programming languages.

The typed code conversion system 100 may include a source code analysis module 102, a data type analysis module 104, a source code annotator module 106, a source code check module 108, a source code data store 110, and a source code characteristics data store 112. The typed code conversion system 100 may include the source code data store 110 configure to store source code to be converted, and maintain modifications to source code as performed by the typed code conversion system 100. The components shown in this figure and all figures herein are exemplary only, and other implementations may include additional, fewer, or different components. Some components may not be shown so as not to obscure relevant details.

The source code analysis module 102 may be configured to analyze source code that is to be converted from dynamically-typed source code to statically-typed source code. As described herein in further detail, the source code may be a codebase for a particular software application, platform, or components, such as a social networking system. To analyze and understand the source code, the source code analysis module 102 may perform one or more operations similar to those performed during compilation of the source code. For instance, the source code analysis module 102 may parse the source code (e.g., using a parser). The analysis performed by the source code analysis module 102 may facilitate identification or understanding of variables and functions in the source code, including those that are statically or dynamically typed. According to some embodiments, the source code analysis module 102 may generate one or more information (e.g., facts, constraints, or characteristics) regarding the source code being analyzed. Such information may, for instance, describe the structure of the source code or the executable output that may result from compilation of the source code. Such information may also describe relationships between two or more data types as defined by the source code, including those relating to class inheritance. Information generated by the source code analysis module 102 may be stored on and maintained by the source code characteristics data store 112, which may be included as part of the typed code conversion system 100.

The data type analysis module 104 may be configured to analyze the data typing of various elements, such as variables and functions, in the source code based on information stored by the source code characteristics data store 112. In particular, the data type analysis module 104 may include a potential data types module 114 configured to determine (e.g., identify) one or more potential data types for dynamically-typed elements (e.g., variables and functions) in the source code. The potential data types module 114 may, in some embodiments, determine a list of potential data types for one or more dynamically-typed variables or functions in the source code. The potential data types module 114 may base the determination on usage of variables or functions in the source code, including the usage of the dynamically-typed variables or functions in the source code. As described herein in further detail, usage of variables in the source code may include assignment of variable values to such variables, and usage of functions in the source code may include the call of functions, the call of functions with one or more parameter values, and the return of one or more values by functions. As also described herein in further detail, the source code characteristics data store 112 may provide information regarding usage of variables or functions in the source code. The source code characteristics data store 112 may store information regarding usage of a particular variable or function as constraints, where each constraint may be associated individual variables or functions in the source code being converted.

For some embodiments, the potential data types module 114 may analyze the data types of values being assigned to variables, the data types of values passed through functions, or the data types of values returned by functions. The potential data types module 114 may include the data types encountered during analysis in the list of potential data types. For example, a first dynamically-typed variable A may be used in one location of the source code (e.g., in a first source code file or a first source code block) with a variable value of a first data type (e.g., assigned a variable value of the first data type), and may be used in another location of the source code (e.g., in a second source code file or second source code block) with a variable value of a second data type (e.g., assigned a variable value of the first data type). In view of this, the potential data types module 114 may determine for the first dynamically-typed variable a list of potential data types that include the first data type and the second data type.

The data type analysis module 104 may also include a candidate data type module 116. The candidate data type module 116 may be configured, based on the determined potential data types, to determine a candidate data type that the typed code conversion system 100 may use when attempting to convert one of the dynamically-typed variables or functions used in the source code. The potential data types may be those determined by the potential data types module 114. In accordance with some with various embodiments, determining a candidate data type may comprise the data type analysis module 104 selecting one of the data types from the potential data types. For example, the potential data types may include a specific data type that is a superclass with respect to the other potential data types, and the data type analysis module 104 may select the specific data type to be the candidate data type. In various embodiments, the data type analysis module 104 may determine a candidate data type that is based on the potential data types but not included as one of the potential data types. The data type analysis module 104 may, for example, determine a candidate data type by deducing, from the potential data types, a data type that is a common ancestor to (e.g., superclass of) each of the potential data types. The data type analysis module 104 may perform such deductions by way of understanding class inheritance of data types through source code characteristics provided by the source code analysis module 102.

The source code annotator module 106 may be configured to annotate or otherwise modify the source code to convert one or more of the dynamically-typed variables or functions using the candidate data type determined for it by the data type analysis module 104. For example, the source code annotator module 106 may use the candidate data type by including the candidate data type in the source code with respect to the one dynamically-typed variable or function. In certain embodiments, the source code annotator module 106 may do this by including in the source code, with respect to the dynamically-typed variable or function, one or more programming language keywords (e.g., reserved keywords or programmer-defined keywords) that correspond to the candidate data type. For instance, where a candidate data type determined for a variable $x is to be an integer, the source code annotator module 106 may include, with the first use of variable $x in the source code, a keyword that designates an integer data type (e.g., "int $x") for the programming language being used in the source code. In doing so, the source code annotator module 106 can cause the source code to invoke static typing with respect to the variable $x. Where a candidate data type determined for the variable $x is a data type defined within the source code (e.g., a programmer-defined class or structure), the source code annotator module 106 may include, with the first use of variable $x in the source code, a keyword that corresponds to and designates a programmer-defined data type (e.g., "Example_Class $x") in accordance with the programming language being used in the source code.

The source code check module 108 may be configured to check the source code for one or more errors that result from source code modifications performed by the source code annotator module 106 to convert dynamically-typed variables or functions to statically-typed variables or functions. In accordance with some embodiments, the source code check module 108 may utilize a type checker to check the source code for errors caused by the conversion process. In the event that no type check errors are detected by the source code check module 108, the modifications to the source code performed by the source code annotator module 106 may be maintained.

The typed code conversion system 100 may perform multiple iterations to convert dynamically-typed elements (e.g., variables or functions) to statically-typed elements in source code. When the typed code conversion system 100 converts a dynamically-typed element to a statically-typed element in an iteration, the typed code conversion system 100 may proceed to another iteration to convert remaining dynamically-typed elements to statically-typed elements. For some embodiments, the conversion of one or more elements in the source code from dynamically typed to statically typed during a given iteration may enable or facilitate conversion of other dynamically-typed elements that remain unconverted from previous iterations to statically-typed elements.

Previously unconverted dynamically-typed elements may arise from different circumstances. In various embodiments, previously unconverted dynamically-typed elements may result from portions of the codebase that were unaffected in earlier iterations. For example, the scope of a codebase subject to conversion may be selectable by an administrator in control of the codebase or the typed code conversion system 100. In this regard, a portion of the codebase, including dynamically-typed elements therein, may have been unaffected because it was outside the selected scope of the codebase subject to prior conversions. As another example, the portions of the codebase may have been unaffected because earlier determinations of codebase characteristics were insufficient to support conversion. In various embodiments, previously unconverted dynamically-typed elements also may result from additions or updates to the codebase that did not exist during previous conversions. The typed code conversion system 100 may perform multiple iterations until all dynamically-typed elements in the source code are converted to statically-typed elements. The source code, once modified or maintained by the typed code conversion system 100, may be saved to the source code data store 110.

In the event that one or more errors are detected, the typed code conversion system 100 may instruct the source code annotator module 106 to reverse the modifications performed to the source code by the source code annotator module 106. Where the typed code conversion system 100 performs multiple iterations to convert dynamically-typed elements (e.g., variables or functions) to statically-typed elements and a type check error occurs during a given iteration, the typed code conversion system 100 may revert elements that were converted during the given iteration back to dynamically-typed elements to reddress the error. After reversion, the typed code conversion system 100 may proceed with an additional iteration where another candidate data type is determined for conversion of the reverted elements. Alternatively, conversion of the reverted elements may be deferred for a later iteration and the typed code conversion system 100 may proceed with conversion of other dynamically-typed elements.

Figure 2:
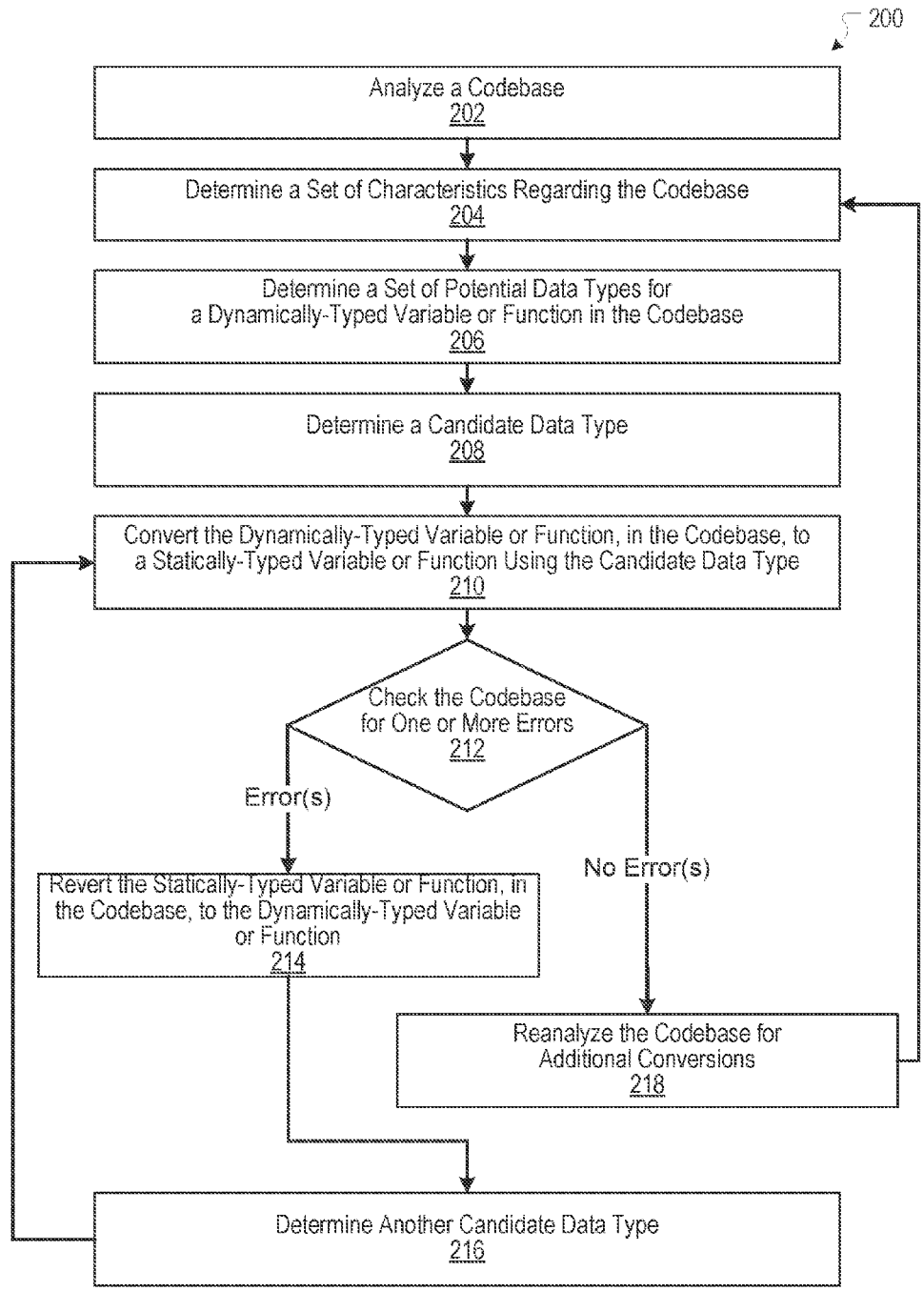
FIG. 2 illustrates an example process for typed code conversion in accordance with an embodiment of the invention.

FIG. 2 illustrates an example process 200 for typed code conversion in accordance with an embodiment of the invention. According to some embodiments, the process 200 may be one performed by the typed code conversion system 100. At block 202, the process 200 may analyze a codebase, which may include a plurality of source code relating to a particular software application, platform, or component. The codebase analyzed may comprise at least one element in its source code that is dynamically typed, such as a dynamically-typed variable, a function having a dynamically-typed return value, or a function having at least one dynamically-typed parameter (e.g., dynamically-typed input variable).

At block 204, the process 200 may determine a set of characteristics regarding the codebase, where such a determination may be based on the analysis of the codebase. The characteristics may comprise information regarding usage of various variables and functions in source code of the codebase, including one or more dynamically-typed variables or functions.

At block 206, the process 200 may determine based on the set of characteristics a set of potential data types for at least one dynamically-typed variable or function in source code in the codebase.

At block 208, the process 200 may determine a candidate data type for the at least one dynamically-typed variables or function in source code in the codebase. The candidate data type may be determined based on the set of potential data types. The candidate data type may be determined further based on the set of characteristics regarding the codebase. In accordance with some embodiments, determining the candidate data type based on the set of potential data types may comprise selecting at least one of the potential data types as the candidate data type. The candidate data type may be an ancestor data type that is commonly related to each of the data types in the set of potential data types. For instance, the candidate data type may be a superclass of the data types in the set of potential data types and each of the data types are subclasses of the candidate data type.

At block 210, the process 200 may convert the at least one dynamically-typed variable or function in the codebase to a statically-typed variable or function in the codebase using the candidate data type. In various embodiments, the conversion of the at least one dynamically-typed variable or function may comprise annotating, or otherwise modifying, source code in the codebase such that the source code invokes static typing with respect to the at least one dynamically-typed variable or function.

At block 212, the process 200 may check the codebase for one or more errors in the codebase, which contains the at least one dynamically-typed variable or function as converted to a statically-typed variable or function. For some embodiments, the codebase may be checked for errors using a type checker configured to perform type safety on various variables or functions in source code in the codebase.

Where one or more errors are detected, at block 214, the process 200 may revert the codebase to the at least one dynamically-typed variable or function. For example, the codebase may be reverted such that the codebase recites the at least one dynamically-typed variable or function as it existed before the conversion at block 210. After reversion of the codebase to the at least one dynamically-typed variable or function, at block 216, the process 200 may determine another candidate data type based on the set of potential data types. The next candidate data type determined may be based on the particular error or errors detected at block 212 and whether the previous candidate data type was selected from one of the potential data types. Subsequently, the process 200 may return to block 210, where the at least one dynamically-typed variable or function may be converted to a statically-typed variable or function using the new candidate data type determined at block 216.

Though not shown, in accordance with some embodiments, when one or more errors are detected at block 212, the process 200 may proceed without determining another candidate data type for the at least one dynamically-typed variable or function (e.g., when no further candidate data types exist at the moment) and proceeding with conversion of another dynamically-typed variable or function.

Where no errors are detected, at block 218, the process 200 may reanalyze the codebase with the conversion of the at least one dynamically-typed variable or function to the statically-typed variable or function being maintained. The process 200 may reanalyze the codebase to identify dynamically-typed variables or functions remaining in the codebase that can be converted to statically-typed variables or functions. As described herein in further detail, at each iteration of the process 200 a successful conversion of variables or functions in the codebase may enable subsequent conversion of dynamically-typed variables or functions that remained unconverted during previous iterations. Subsequent to the reanalysis, the process 200 may return to block 204, where another set of characteristics may be determined regarding the codebase that contains the maintained conversion of the at least one dynamically-typed variable or function.

In accordance with some embodiments, the process 200 may perform multiple iterations whereby each iteration may result in a successful conversion of a variable or function in the codebase, or unsuccessful conversion and another candidate data type being selected for the next iteration. Depending on the embodiment, the process 200 may be performed for multiple iterations until such time as all dynamically-typed variables or functions in the codebase are converted to a statically-typed variables or functions.

In some embodiments, each iteration of the process 200 may result in more than one dynamically-typed variable or function (i.e., a plurality of dynamically-typed variables or functions) in the codebase being converted and the resulting codebase being checked for errors. Where one or more errors are detected during the iteration, the process 200 may reverse the conversion of those converted variables or functions that cause the errors, or may reverse all of the variables or functions that were converted during the iteration, regardless of their causal relation to codebase errors.

Figure 3:
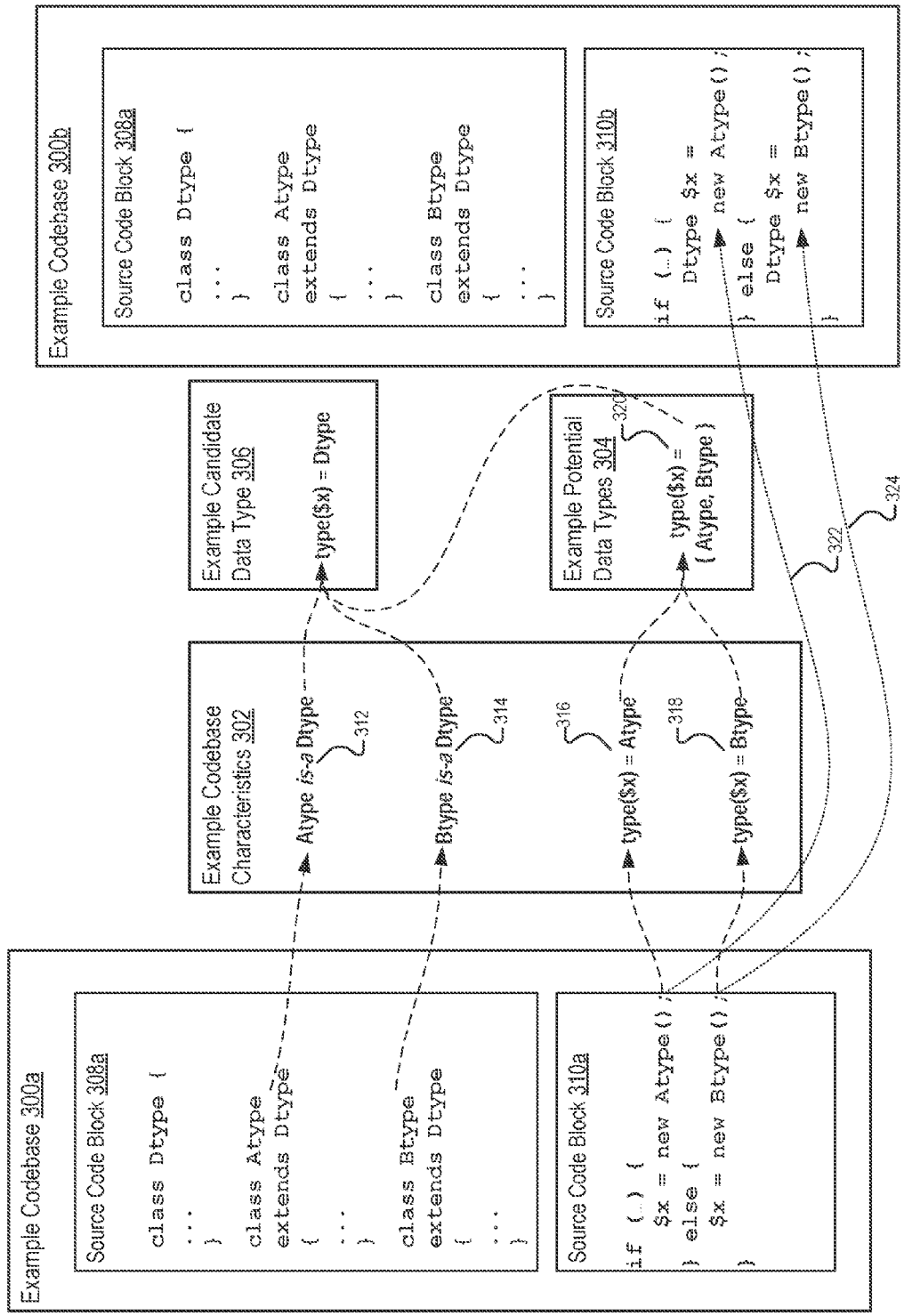
FIG. 3 illustrates an example typed code conversion of an example codebase in accordance with an embodiment of the invention.

FIG. 3 illustrates an example typed code conversion of an example codebase 300a in accordance with an embodiment of the invention. As shown, the example codebase 300a may include a source code block 308a and a source code block 310a. As also shown, the source code block 308a defines a Dtype data type, an Atype data type that extends the Dtype data type, and an Btype data type that extends the Dtype data type. By respectively extending the Dtype data type, each of the Atype data type and the Btype data type is considered a subclass of the Dtype data type and considered to have a "is-a" relationship with the Dtype data type. According to the source code block 310a, a variable $x is assigned a value that is an Atype data type under one if condition and another value that is a Btype data type under an alternative else condition. For illustrative purposes, the variable $x can be understood to be a dynamically typed due to the lack of at least one data type keyword or other designator in the source code block 310a with respect to the variable $x In accordance with some programming languages, the variable $x may be considered to be statically typed when a programming language keyword or other designator is included in the source code to specify a data type for the variable.

The typed code conversion system 100 may analyze the example codebase 300a and determine characteristics regarding the source code in the codebase 300a, including the source code block 308a and the source code block 310a. The typed code conversion system 100 may, for instance, generate example codebase characteristics 302, which may be stored to the source code characteristics data store 112. The example codebase characteristics 302 may describe aspects of the source code block 308a and the source code block 310a. For instance, based on analysis of the source code block 308a, the typed code conversion system 100 may generate in the example codebase characteristics 302 a fact 312 that a variable of Atype is also a variable of Dtype, and a fact 314 that a variable of Btype is also a variable of Dtype. Further, based on the analysis of the source code block 310a, the typed code conversion system 100 may generate in the example codebase characteristics 302 a fact 316 that the variable $x has been used with a value of Atype, and a fact 318 that the variable $x has been used with a value of Btype.

Using the example codebase characteristics 302, the typed code conversion system 100 may determine example potential data types 304. In particular, the example potential data types 304 provides for the variable $x a set 320 of data potential types, including Atype and Btype data types. In accordance with some embodiments, the potential data types listed in the example potential data types 304 may include those data types encountered with respect to the variable $x during analysis of the example codebase 300a by the typed code conversion system 100. The typed code conversion system 100 may further determine that an example candidate data type 306 may be a Dtype data type, given the fact 312 that a variable of Atype is also a variable of Dtype and the fact 314 that a variable of Btype is also a variable of Dtype. The typed code conversion system 100 may determine from the facts 312 and 314 that that Dtype is a common superclass for both the Atype and Btype data types. In some embodiments, the typed code conversion system 100 may determine that the candidate data type is one selected from the example potential data types that is a common ancestor of the other potential data types.

The typed code conversion system 100 may utilize the example candidate data type 306 to modify the example codebase 300a such that the source code block 310a includes a data type designator with respect to the variable $x. For instance, the typed code conversion system 100 may perform modifications 322 and 324 of the source code block 310a such that a resulting example codebase 300b has a source code block 310b that includes the Dtype data type designator with respect to the variable $x. For illustrative purposes, the variable $x now can be understood to be statically typed based on the Dtype data type designation with respect to the variable $x. In some embodiments, the typed code conversion system 100 may perform different modifications to achieve the conversion of variables or functions from dynamic typing to static typing. Such different modifications may involve designation of different data types in different locations in the codebase 300a.

Figure 4:
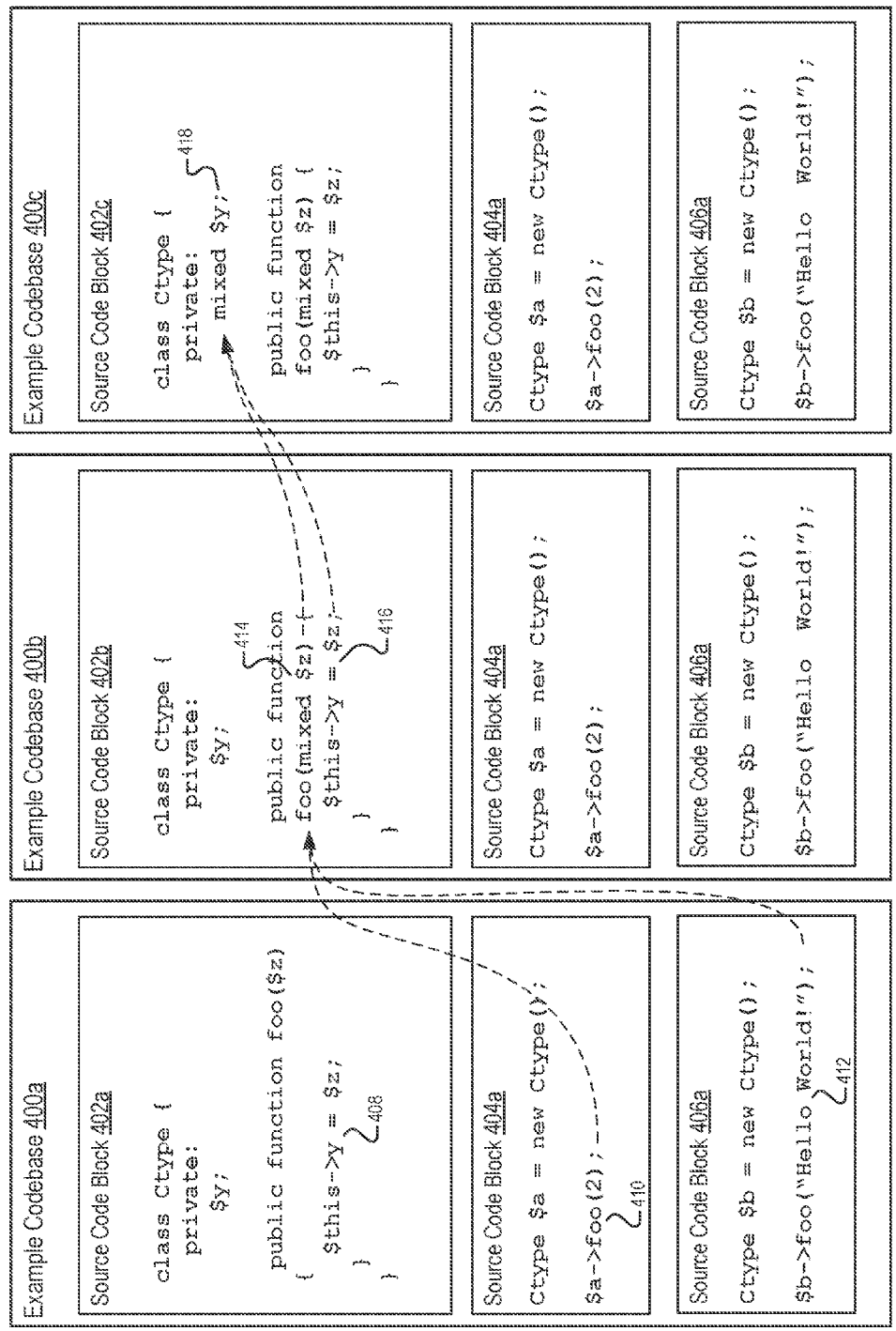
FIG. 4 illustrates an example typed code conversion of an example codebase in accordance with an embodiment of the invention.

FIG. 4 illustrates an example typed code conversion of an example codebase 400a in accordance with an embodiment of the invention. In particular, FIG. 4 illustrates how the conversion of a variable $z in the example codebase 400a from being dynamically typed to being statically typed (e.g., during a first iteration) can enable or otherwise facilitate a similar conversion for another variable $y in the example codebase 400a.

In accordance with some embodiments, the typed code conversion system 100 may analyze the example codebase 400a and determine characteristics regarding the source code in the codebase 400a, including the source code blocks 402a, 404a, and 406a. Using the characteristics determined for source code block 402a in the illustrated example, the typed code conversion system 100 may understand that Ctype data type variables include a member variable $y that is dynamically typed, and further include a member function foo that receives one parameter through a variable $z that is dynamically typed and assigns the value of the dynamically-typed variable $z to the dynamically-typed variable $y at location 408 in the source code block 402a. Using the characteristics determined for the source code blocks 404a and 406a in the illustrated example, the typed code conversion system 100 may understand that variables $a and $b of the source code block 402a and the source code block 406a, respectively, are statically typed as Ctype data types, that the member function foo is called with respect to the variable $a with an integer value of 2 at location 410 in the source code block 404a, and that the member function foo is called with respect to the variable $b with a string value of 'Hello World!' at location 412 in the source code block 406a.

The typed code conversion system 100 may use the characteristics of the source code in the codebase. Based on the passing of an integer value and a string value to the member function foo in the illustrated example, the typed code conversion system 100 may determine a set of potential data types for the variable $z that includes integer and string. From this set of potential data types, the typed code conversion system 100 may determine that the candidate data type, to be used in converting the variable $z from dynamic typing to static typing, should be a mixed data type configured to handle a mix of data types. Accordingly, the typed code conversion system 100 may modify the example codebase 400a such that the source code block 402a includes a mixed data type designator with respect to the variable $z. This may result in an example codebase 400b having a source code block 402b that includes, at location 414, a mixed data type designator with respect to the variable $z.

Subsequently, the typed code conversion system 100 may check the example codebase 400b for one or more errors, particularly with respect to type safety. Where no errors are detected, the modifications to the source code block 402*b* may be maintained. In the event an error is detected, the conversion may be reversed and either another candidate data type is determined or the conversion of the variable $z is deferred for a later time (e.g., another iteration).

Where the example codebase 400*b* is maintained, the typed code conversion system 100 may analyze the example codebase 400*b* and determine characteristics regarding the source code in the codebase 400*b*, including the source code blocks 402*b*, 404*a*, and 406*a*. As the source code blocks 404*a* and 406 remained the same between the example codebases 400*a* and 400*b*, the characteristics in regard to those blocks may also remain the same. However, using the characteristics determined for the source code block 402*b*, the typed code conversion system 100 may now understand that the member function foo receives one parameter through a variable $z that is statically typed as a mixed data type, and that the member function foo assigns the value of the statically-typed variable $z to the dynamically-typed variable $y at location 416 in the source code block 402*b*.

Based on the changes to the characteristics, the typed code conversion system 100 may determine a set of potential data types for variable $y that includes a mixed data type. From this set of potential data types, the typed code conversion system 100 may further determine that the candidate data type, to be used in converting the variable $y from dynamic typing to static typing, should be a mixed data type. Accordingly, the typed code conversion system 100 may modify the example codebase 400*b* such that the source code block 402*b* includes a mixed data type designator with respect to the variable $y. This may result in an example codebase 400*c* having a source code block 402*c* that includes, at location 418, a mixed data type designator with respect to the variable $y. In this way, the dynamic-to-static type conversion of the variable $z propagates to and facilitates the dynamic-to-static type conversion of the variable $y.

In accordance with some embodiments, the example codebase 400*b* may result after one iteration of the conversion process as performed on the example codebase 400*a* by the typed code conversion system 100. Additionally, the example codebase 400*c* may result after another iteration of the conversion process.

Figure 5:
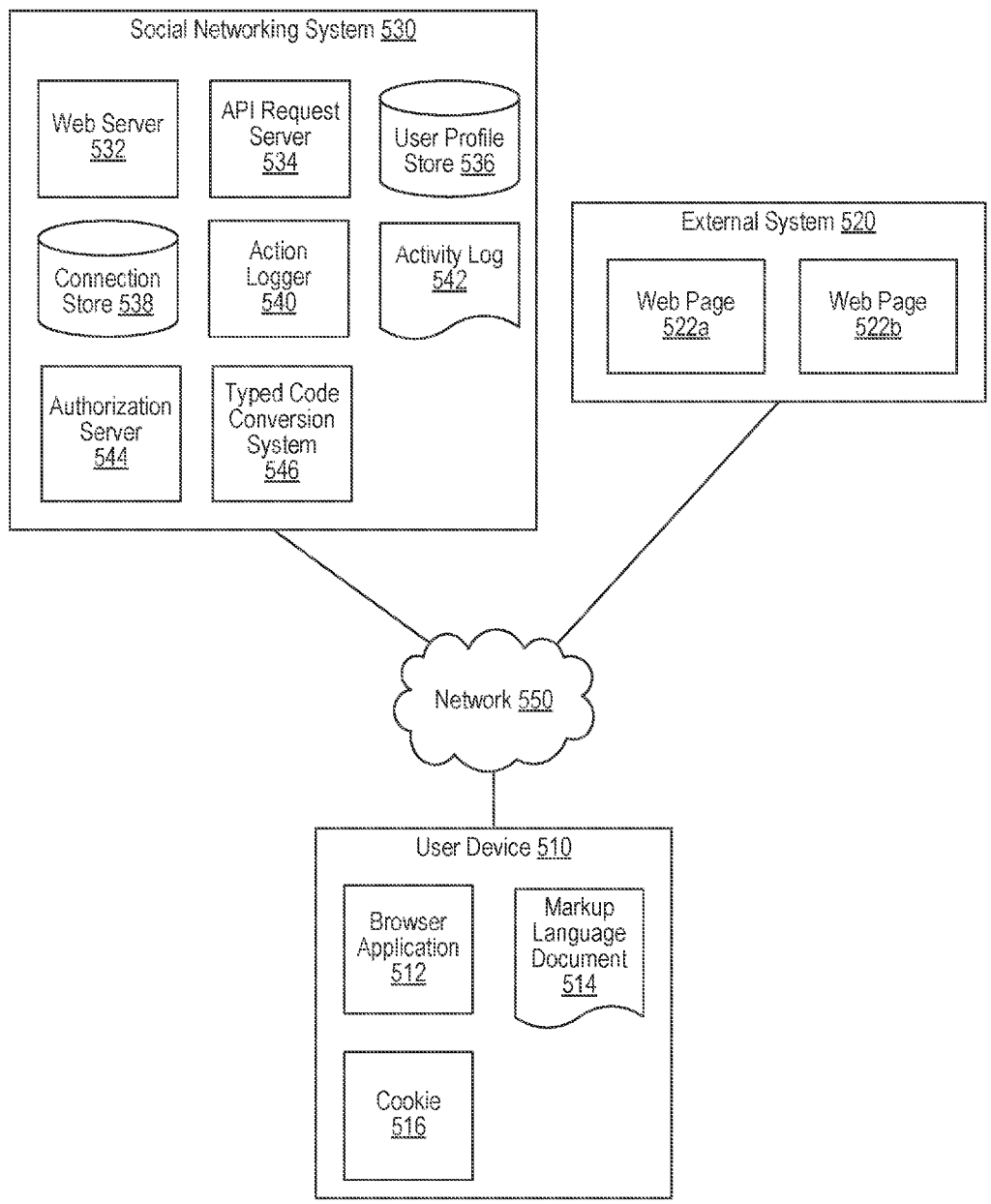
FIG. 5 illustrates an example of a network diagram of system for typed code conversion in a social networking system in accordance with an embodiment of the invention.

FIG. 5 illustrates an example of a network diagram of system for typed code conversion in a social networking system 530 in accordance with an embodiment of the invention. The system 500 includes one or more user devices 510, one or more external systems 520, the social networking system 530, and a network 550. For purposes of illustration, the embodiment of the system 500, shown by FIG. 5, includes a single external system 520 and a single user device 510. However, in other embodiments, the system 500 may include more user devices 510 and more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices that can receive input from a user and transmit and receive data via the network 550. In one embodiment, the user device 510 is a conventional computer system executing, for example, a Microsoft Windows compatible operating system (OS), Apple OS X, and/or a Linux distribution. In another embodiment, the user device 510 can be a device having computer functionality, such as a smart-phone, a tablet, a personal digital assistant (PDA), a mobile telephone, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and wide area networks, using wired and/or wireless communication systems.

In one embodiment, the network 550 uses standard communications technologies and protocols. Thus, the network 550 can include links using technologies such as Ethernet, 502.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the SilverLight™ application framework, etc.

In one embodiment, the user device 510 also includes one or more cookies 516 including data indicating whether a user of the user device 510 is logged into the social networking system 530, which may enable customization of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content.

The social networking system 530 includes one or more computing devices for a social network, including a plurality of users, and providing users of the social network with the ability to communicate and interact with other users of the social network. As described herein in further detail, the social network can be represented by a graph, i.e., a data structure including edges and nodes. Other data structures can also be used to represent the social network, including but not limited to databases, objects, classes, meta elements, files, or any other data structure.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects a particular other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. As discussed herein, the social networking system 530 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 530. As described herein in further detail, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music or other similar data and/or media. Content may also be added to the social networking system 530 by a third-party. Content "items" are represented as objects in the social networking system 530. In this way, users of the social networking system 530 are encouraged to communicate with each other by posting text and content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, an authorization server 544, and a typed code conversion system 546. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list". External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

As described above in further detail, the typed code conversion system 546 contains logic that enables conversion dynamically-typed source code, which may be included in script code, to statically-typed source code. In an embodiment, the typed code conversion system 546 may be implemented by the typed code conversion system 100. The typed code conversion system 546 may, for example, be utilized to convert a codebase comprising script code that implements the social networking system 530, from containing dynamically-typed code to containing statically-typed code. To convert script code from being dynamically-typed to being statically-typed, the typed code conversion system 546 may modify the dynamically-typed script code to invoke static typing with respect to a variable or a function used in the script code. The typed code conversion system 546 may accomplish this by annotating dynamically-typed elements (e.g., variables or functions) in the script code source code with one or more script language keywords, such as reserved or programmer-defined keywords, that indicate the data type associated with the elements. As noted herein in further detail, examples of data types that may be supported by a programming language, such as a scripting language, may include, without limitation, "int" for integer data types, "float" for floating-point data types, "bool" for Boolean data types, "mixed" for elements that can receive a mix of data types, and "?" for those data types that are nullable (e.g., "?int" for a nullable integer data type, or "?float" for a nullable float data type). The script language keywords employed may depend on the scripting language employed in the script code. The typed code conversion system 546 may perform conversion process such that the dynamically-typed source code and the resulting statically-typed source code are in the same scripting language.

Figure 6:
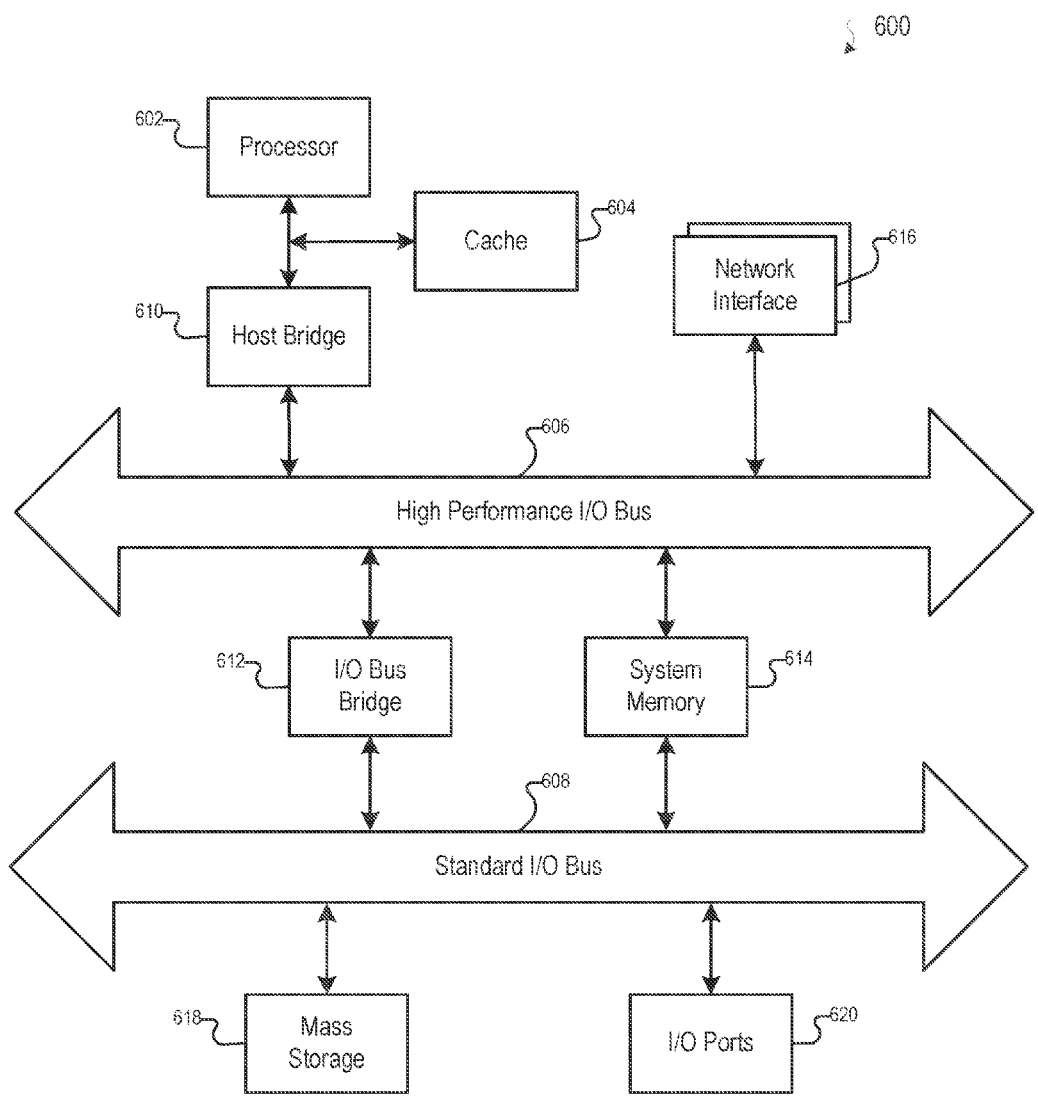
FIG. 6 illustrates a diagram of a computer system in accordance with an embodiment of the invention.

The foregoing processes, systems and features can be implemented by a wide variety of machine and computer system architectures and in a wide variety of network and computing environments. FIG. 6 illustrates an example of a computer system 600 that may be used to implement one or more of the computing devices identified above. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be one of the typed code conversion system 100, the social networking system 530, or a component thereof.

The computer system 600 includes a processor 602, a cache memory 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples the processor 602 to the high performance I/O bus 606, whereas I/O bus bridge 612 couples the two buses 606 and 608 to each other. A system memory 614 and one or more network interfaces 616 couple to the bus 606. The computer system 600 may further include video memory and a display device coupled to the video memory (not shown). Mass storage 618 and I/O ports 620 couple to the bus 608. The computer system 600 may optionally include a keyboard and pointing device, a display device, or other input/output devices (not shown) coupled to the bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 600 are described in greater detail below. In particular, the network interface 616 provides communication between the computer system 600 and any of a wide range of networks, such as an Ethernet (e.g., IEEE 602.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 which, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614, and then accessed and executed by processor 602. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", "another embodiment", one series of embodiments", some embodiments", "various embodiments", or the like means that a particular feature, design, structure, or characteristic described in connection with the embodiment is included in at least one embodiment of the disclosure. The appearances of, for example, the phrase in one embodiment", in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   scanning, by a computer system, a codebase to determine a first set of characteristics associated with a first dynamically-typed variable or function in the codebase;
   determining, by the computer system, a first set of potential data types for the first dynamically-typed variable or function based on the first set of characteristics;
   determining, by the computer system, a first candidate data type that is a superclass of data types associated with the first set of characteristics, and wherein each of the data types associated with the first set of characteristics is a subclass of the first candidate data type;
   converting, by the computer system, the first dynamically-typed variable or function in the codebase to a first statically-typed variable or function in the codebase based on the first candidate data type; and
   checking, by the computer system, the codebase for one or more errors in response to the converting the first dynamically-typed variable or function to the first statically-typed variable or function.

2. The computer-implemented method of claim 1, wherein scanning the codebase generates at least one of a fact or a constraint regarding source code included in the codebase.

3. The computer-implemented method of claim 1, wherein the superclass of the data types associated with the first set of characteristics corresponds to a common ancestor to each of the data types associated with the first set of characteristics.

4. The computer-implemented method of claim 1, wherein converting the first dynamically-typed variable or function in the codebase to the first statically-typed variable or function in the codebase further comprises converting a source code from a first programming language that permits dynamic data typing to a second programming language that requires static data typing.

5. The computer-implemented method of claim 1, wherein converting the first dynamically-typed variable or function in the codebase to the first statically-typed variable or function in the codebase further comprises modifying the first dynamically-typed variable or function to be statically typed thereby producing the first statically-typed variable or function.

6. The computer-implemented method of claim 5, wherein modifying the first dynamically-typed variable or function further comprises invoking static typing with respect to the first dynamically-typed variable or function.

7. The computer-implemented method of claim 5, wherein modifying the first dynamically-typed variable or function further comprises annotating the first dynamically-typed variable or function with one or more reserved keywords for a programming language associated with the first dynamically-typed variable or function.

8. A computer system comprising:
   at least one processor; and
   a memory storing instructions configured to instruct the at least one processor to perform:
   scanning a codebase to determine a first set of characteristics associated with a first dynamically-typed variable or function in the codebase;
   determining a first set of potential data types for the first dynamically-typed variable or function based on the first set of characteristics;
   determining a first candidate data type that is a superclass of data types associated with the first set of characteristics, and wherein each of the data types associated with the first set of characteristics is a subclass of the first candidate data type;
   converting the first dynamically-typed variable or function in the codebase to a first statically-typed variable or function in the codebase based on the first candidate data type; and
   checking the codebase for one or more errors in response to the converting the first dynamically-typed variable or function to the first statically-typed variable or function.

9. The computer system of claim 8, wherein scanning the codebase generates at least one of a fact or a constraint regarding source code included in the codebase.

10. The computer system of claim 8, wherein the superclass of the data types associated with the first set of characteristics corresponds to a common ancestor to each of the data types associated with the first set of characteristics.

11. The computer system of claim 8, wherein converting the first dynamically-typed variable or function in the codebase to the first statically-typed variable or function in the codebase further comprises converting a source code from a first programming language that permits dynamic data typing to a second programming language that requires static data typing.

12. The computer system of claim 8, wherein converting the first dynamically-typed variable or function in the codebase to the first statically-typed variable or function in the codebase further comprises modifying the first dynamically-typed variable or function to be statically typed thereby producing the first statically-typed variable or function.

13. The computer system of claim 12, wherein modifying the first dynamically-typed variable or function further comprises invoking static typing with respect to the first dynamically-typed variable or function.

14. The computer system of claim 12, wherein modifying the first dynamically-typed variable or function further comprises annotating the first dynamically-typed variable or function with one or more reserved keywords for a programming language associated with the first dynamically-typed variable or function.

15. A non-transitory computer-storage medium storing computer-executable instructions that, when executed, cause a computer system to perform a computer-implemented method comprising:
   scanning, by a computer system, a codebase to determine a first set of characteristics associated with a first dynamically-typed variable or function in the codebase;
   determining, by the computer system, a first set of potential data types for the first dynamically-typed variable or function based on the first set of characteristics;
   determining, by the computer system, a first candidate data type that is a superclass of data types associated with the first set of characteristics, and wherein each of the data types associated with the first set of characteristics is a subclass of the first candidate data type;
   converting, by the computer system, the first dynamically-typed variable or function in the codebase to a first statically-typed variable or function in the codebase based on the first candidate data type; and
   checking, by the computer system, the codebase for one or more errors in response to the converting the first dynamically-typed variable or function to the first statically-typed variable or function.

16. The non-transitory computer-storage medium of claim 15, wherein scanning the codebase generates at least one of a fact or a constraint regarding source code included in the codebase.

17. The non-transitory computer-storage medium of claim 15, wherein the superclass of the data types associated with the first set of characteristics corresponds to a common ancestor to each of the data types associated with the first set of characteristics.

18. The non-transitory computer-storage medium of claim 15, wherein converting the first dynamically-typed variable or function in the codebase to the first statically-typed variable or function in the codebase further comprises converting a source code from a first programming language that permits dynamic data typing to a second programming language that requires static data typing.

19. The non-transitory computer-storage medium of claim 15, wherein converting the first dynamically-typed variable or function in the codebase to the first statically-typed variable or function in the codebase further comprises modifying the first dynamically-typed variable or function to be statically typed thereby producing the first statically-typed variable or function.

20. The non-transitory computer-storage medium of claim 19, wherein modifying the first dynamically-typed variable or function further comprises invoking static typing with respect to the first dynamically-typed variable or function.

* * * * *